(12) United States Patent
Tenno (10) Patent No.: US 10,141,650 B2
(45) Date of Patent: Nov. 27, 2018

(54) ANTENNA MODULE AND ELECTRONIC DEVICE

(71) Applicant: Murata Manufacturing Co., Ltd., Nagaokakyo-shi, Kyoto-fu (JP)

(72) Inventor: Nobuyuki Tenno, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 53 days.

(21) Appl. No.: 15/480,519

(22) Filed: Apr. 6, 2017

(65) Prior Publication Data

US 2017/0214139 A1 Jul. 27, 2017

Related U.S. Application Data

(63) Continuation of application No. PCT/JP2015/082826, filed on Nov. 24, 2015.

(30) Foreign Application Priority Data

Dec. 17, 2014 (JP) .................... 2014-255624

(51) Int. Cl.
| | |
|---|---|
| *H01Q 7/06* | (2006.01) |
| *H01Q 7/08* | (2006.01) |
| *H01Q 1/38* | (2006.01) |
| *G06K 7/10* | (2006.01) |
| *G06K 19/077* | (2006.01) |

(Continued)

(52) U.S. Cl.
CPC .......... *H01Q 7/08* (2013.01); *G06K 7/10237* (2013.01); *G06K 7/10336* (2013.01);
(Continued)

(58) Field of Classification Search
CPC .. H01Q 7/00; H01Q 1/52; H01Q 7/06; H01Q 1/22; H01Q 1/50; H01Q 7/08; H01Q 1/38
(Continued)

(56) References Cited

U.S. PATENT DOCUMENTS

| | | |
|---|---|---|
| 2007/0069397 A1 | 3/2007 | Van Lerberghe et al. |
| 2012/0206239 A1 | 8/2012 | Ikemoto |

(Continued)

FOREIGN PATENT DOCUMENTS

| | | |
|---|---|---|
| CN | 1868060 A | 11/2006 |
| CN | 104025463 A | 9/2014 |

(Continued)

OTHER PUBLICATIONS

Official Communication issued in International Patent Application No. PCT/JP2015/082826, dated Dec. 28, 2015.

*Primary Examiner* — Joseph Lauture
(74) *Attorney, Agent, or Firm* — Keating & Bennett, LLP (57) ABSTRACT

An antenna module includes a multilayer body of laminated insulator layers, surface-mounted devices on a top surface of the multilayer body, an antenna coil with a coil winding axis extending in the laminating direction of the insulator layers or in a direction parallel or substantially parallel to the insulator layers, and wiring conductors electrically connected with the surface-mounted devices or the antenna coil. The antenna coil includes coil conductors on more than one of the insulator layers, and interlayer connection conductors, each of which electrically connects end portions of corresponding ones of the coil conductors to each other, to define a helical shape. The wiring conductors are within a space defined through formation of the antenna coil, in the laminating direction of the insulator layers.

16 Claims, 7 Drawing Sheets

(51) Int. Cl.
*H01Q 11/08* (2006.01)
*H01F 17/00* (2006.01)
*H01Q 7/00* (2006.01)
*H01Q 1/22* (2006.01)
*H01Q 1/50* (2006.01)

(52) U.S. Cl.
CPC ... *G06K 19/07722* (2013.01); *H01F 17/0013* (2013.01); *H01Q 1/2225* (2013.01); *H01Q 1/38* (2013.01); *H01Q 11/08* (2013.01); *H01F 2017/004* (2013.01); *H01F 2017/0066* (2013.01); *H01Q 1/22* (2013.01); *H01Q 1/50* (2013.01); *H01Q 7/00* (2013.01); *H01Q 7/06* (2013.01)

(58) Field of Classification Search
USPC .................. 343/788, 749, 850, 858, 866
See application file for complete search history.

(56) References Cited

U.S. PATENT DOCUMENTS

| | | |
|---|---|---|
| 2014/0203981 A1 | 7/2014 | Nakano et al. |
| 2014/0253404 A1 | 9/2014 | Ikemoto et al. |
| 2015/0035718 A1 | 2/2015 | Gouchi et al. |
| 2016/0352016 A1* | 12/2016 | Ito .......................... H01Q 7/00 |

FOREIGN PATENT DOCUMENTS

| | | |
|---|---|---|
| JP | 2013-168780 A | 8/2013 |
| JP | 2014-107573 A | 6/2014 |
| JP | 2014-140253 A | 7/2014 |
| WO | 2011/118379 A1 | 9/2011 |
| WO | 2013/115158 A1 | 8/2013 |
| WO | 2014/024762 A1 | 2/2014 |

* cited by examiner

ANTENNA MODULE AND ELECTRONIC DEVICE

CROSS REFERENCE TO RELATED APPLICATIONS

This application claims the benefit of priority to Japanese Patent Application No. 2014-255624 filed on Dec. 17, 2014 and is a Continuation Application of PCT Application No. PCT/JP2015/082826 filed on Nov. 24, 2015. The entire contents of each application are hereby incorporated herein by reference.

BACKGROUND OF THE INVENTION

1. Field of the Invention

The present invention relates to an antenna module and an electronic device including the antenna module. The antenna module may be included, for example, in a RFID (radio frequency identification) system, a short-distance wireless communication (NFC: near field communications) system, and the like.

2. Description of the Related Art

Antenna coils have been used in short-distance wireless communication such as NFC. Japanese Unexamined Patent Application Publication No. 2014-107573 describes an antenna module that includes a multilayer body of insulator layers and that also includes surface-mounted devices. The antenna module described in Japanese Unexamined Patent Application Publication No. 2014-107573 has a configuration in which via conductors connecting the surface-mounted devices to terminal electrodes are disposed in a center portion located between interlayer connection conductors for an antenna coil which are disposed at the ends of linear conductors, achieving reduction in interference between the antenna coil and the via conductors.

Typically, in many cases, in order that an antenna coil formed in a multilayer body has improved antenna characteristics, the insulator layers are defined by magnetic bodies. To retain the mechanical strength, the outermost insulator layers are defined by nonmagnetic bodies in some cases.

When surface-mounted devices are disposed on the top surface of a multilayer body, mounting electrodes for mounting the surface-mounted devices and insulator layers on which wiring conductors connected to the mounting electrodes are formed need to be further disposed on a surface of the multilayer body for an antenna coil. Therefore, an antenna module having surface-mounted devices becomes larger due to the size of the above-described insulator layers. An attempt to reduce the antenna module in size so as to cancel the increase in size leads to a reduction in the size of the antenna coil, resulting in degradation in antenna characteristics.

In addition, when a high voltage is applied between mounting and terminal electrodes and the wiring conductors, the distance between the mounting and terminal electrodes and the wiring conductors is made larger in order to improve voltage endurance, resulting in an increase in the size of the antenna module. An attempt to reduce the antenna module in size so as to cancel the increase in size makes the size of the antenna coil small, resulting in degradation in antenna characteristics.

A similar problem arises when the outermost layers of the multilayer body are formed of nonmagnetic bodies in order to retain mechanical strength.

SUMMARY OF THE INVENTION

Preferred embodiments of the present invention provide an antenna module with reduced size and improved antenna characteristics, and an electronic device including the antenna module.

According to a preferred embodiment of the present invention, an antenna module includes a multilayer body, a surface-mounted device, an antenna coil, and at least one wiring conductor. The multilayer body includes a plurality of insulator layers that are laminated on one another. The surface-mounted device is mounted on a top surface of the multilayer body. The antenna coil includes a plurality of coil conductors and a plurality of interlayer connection conductors that define a helical or substantially helical shape in a laminating direction of the plurality of insulator layers. The plurality of coil conductors are provided on more than one of the plurality of insulator layers. Each of the plurality of interlayer connection conductors electrically connects end portions of corresponding ones of the plurality of coil conductors to each other. The at least one wiring conductor is electrically connected with the surface-mounted device or the antenna coil. The at least one wiring conductor is disposed within a space defined through formation of the antenna coil. The at least one wiring conductor is disposed in the laminating direction of the insulator layers.

According to the above-described features, the at least one wiring conductor is located inside the winding of the antenna coil. Therefore, the size of the antenna coil may be made large to improve or increase the antenna characteristics. Without reducing the size of the antenna coil, the antenna module may be reduced in size. In addition, the at least one wiring conductor may be separated from mounting electrodes and terminal electrodes, thus providing high voltage endurance. In addition, to provide a high voltage endurance, it is not necessary to increase the thickness between the layer on which the mounting electrodes or the terminal electrodes are provided and the layer on which the at least one wiring conductor is provided. Therefore, the size of the antenna module is able to be reduced.

Preferably, for example, more than one of the plurality of insulator layers includes a plurality of magnetic layers and a nonmagnetic layer located between the plurality of magnetic layers. Each of the more than one of the plurality of insulator layers is included in the multilayer body and is a layer in which the antenna coil is provided. Thus, when nonmagnetic layers are provided as the outermost layers in order to provide a high mechanical strength, even if the nonmagnetic layers are made thinner, a predetermined mechanical strength may be provided.

Preferably, for example, the at least one wiring conductor is disposed on the surface of the nonmagnetic layer or in the nonmagnetic layer. Thus, the magnetic layers may be disposed close to linear electrodes of the antenna coil, resulting in increased inductance and antenna characteristics. In addition, the effective relative magnetic permeability adjacent to or in a vicinity of the at least one wiring conductor may be significantly reduced or prevented due to the nonmagnetic layer. Therefore, unnecessary inductance components of the at least one wiring conductor may be significantly reduced or prevented.

An electronic device according to a preferred embodiment of the present invention includes an antenna module. Thus, an electronic device including a small-sized antenna module or an antenna module with high or increased antenna characteristics may be obtained.

Preferably, for example, an electronic device according to a preferred embodiment of the present invention further includes a circuit board that has a wiring conductor pattern provided thereon. The wiring conductor pattern is electrically connected to the antenna coil. Thus, the wiring conductor pattern on the circuit board operates as a portion of a radiating element. Thus, despite including a small-sized antenna module, predetermined antenna characteristics are able to be provided. An electronic device including an antenna having high or increased antenna characteristics may be provided.

According to preferred embodiments of the present invention, a relative increase in the size of an antenna coil provides improved and increased antenna characteristics. Without reducing the size of the antenna coil, the antenna module may be reduced in size. In addition, wiring conductors are disposed far from mounting electrodes and terminal electrodes, enabling a high voltage endurance to be provided. In addition, to provide a high voltage endurance, it is not necessary to increase the thickness between a layer on which the mounting electrodes or the terminal electrodes are provided and a layer on which the wiring conductors are provided. Therefore, the antenna module is able to be reduced in size while maintaining a predetermined voltage endurance.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A first preferred embodiment of the present invention provides an antenna module that may be used, for example, in RFID communications on a HF band. The HF band may be, for example, the 13.56 MHz band.

Figure 1:
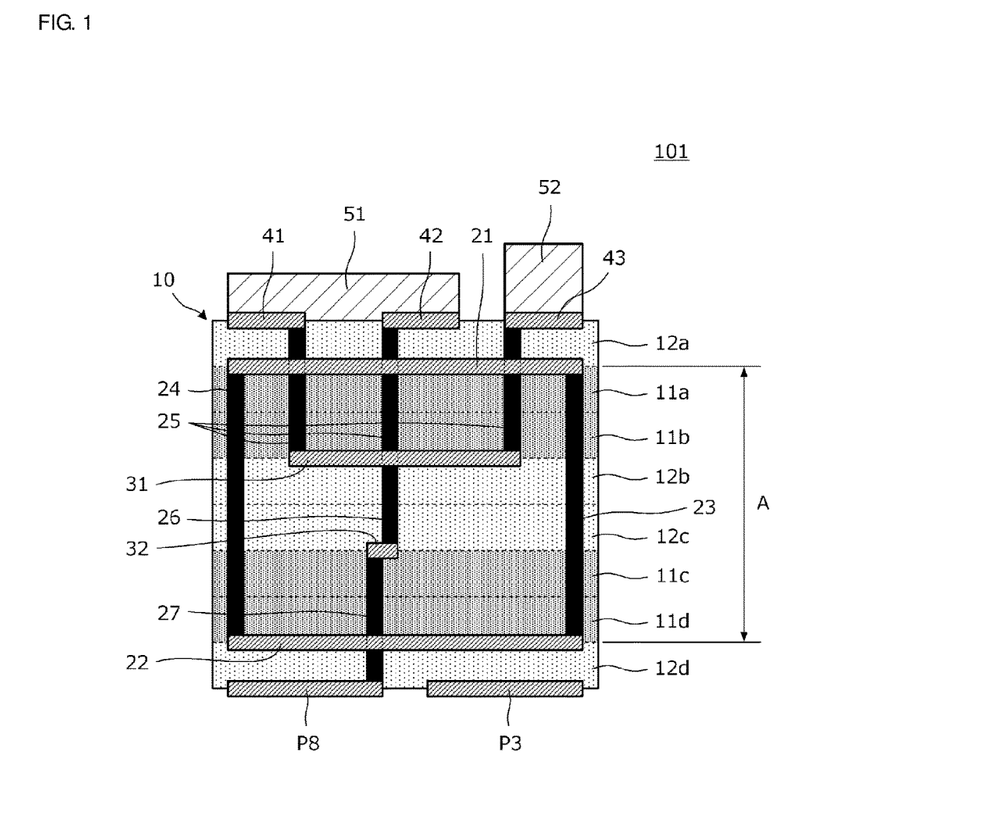
FIG. 1 is a cross-sectional view of a portion of the inside of an antenna module according to a first preferred embodiment of the present invention, in the winding axis direction of an antenna coil.
Figure 2:
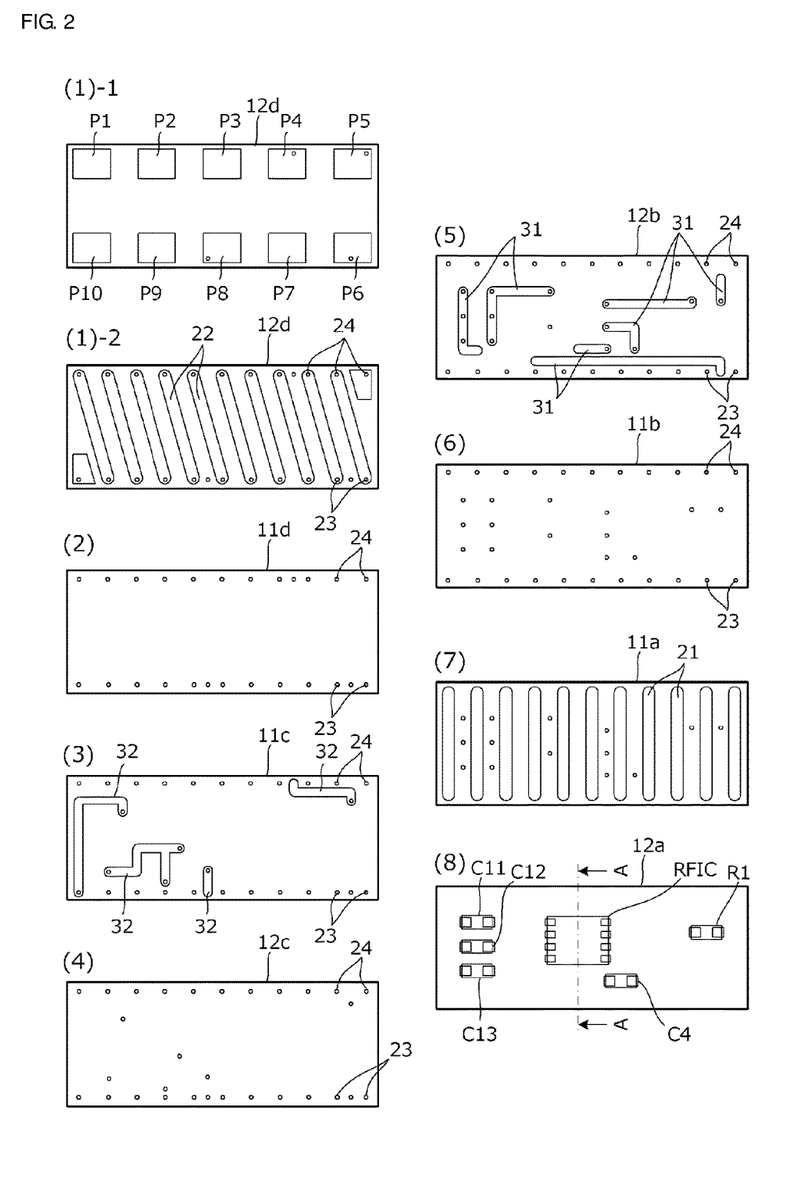
FIG. 2 is a plan view of the layers of the antenna module shown in FIG. 1 before lamination.
Figure 7:
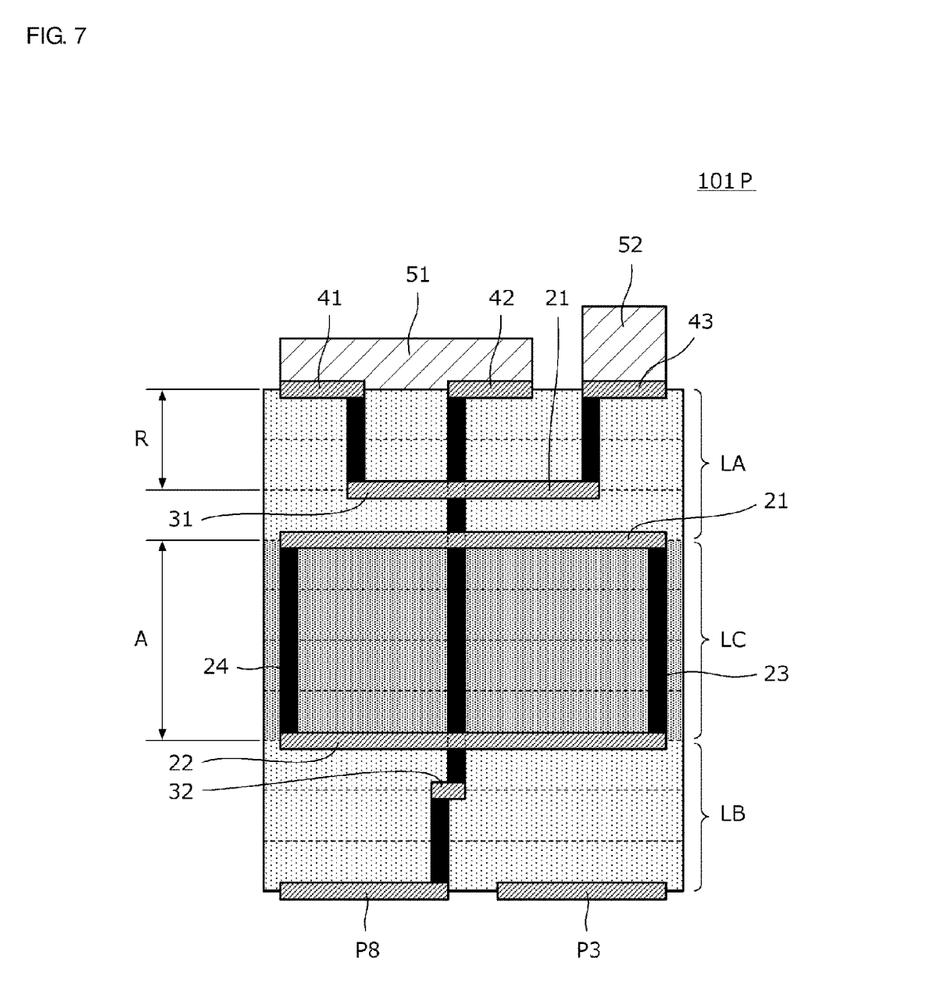
FIG. 7 is a cross-sectional view of a portion of the inside of an antenna module, which is a comparison target, in the winding axis direction of an antenna coil.

FIG. 1 is a cross-sectional view of a portion of the inside of an antenna module 101 according to the first preferred embodiment, in the winding axis direction of an antenna coil. FIG. 2 is a plan view of the layers of the antenna module 101 before lamination. FIG. 7 is a cross-sectional view of a portion of the inside of an antenna module 101P, which is a comparison target, in the winding axis direction of an antenna coil. FIGS. 1 and 7 are provided for simplicity of description regarding the first preferred embodiment, and the wiring arrangement, connections, and the like in the antenna module 101 shown in FIG. 2 do not completely match the wiring arrangement, connections, and the like in FIGS. 1 and 7 for clarity.

As shown in FIG. 1, the antenna module 101 according to the first preferred embodiment includes a multilayer body 10 in which insulator layers 12a, 11a, 11b, 12b, 12c, 11c, 11d, and 12d are laminated, surface-mounted devices 51 and 52 mounted on the top surface of the multilayer body 10, an antenna coil whose coil winding axis extends in a longitudinal direction of the insulator layers, and wiring conductors 31 and 32 electrically connected with the surface-mounted devices 51 and 52 or the antenna coil. Preferably, the wiring conductors 31 and 32 are not a conductor pattern included in the antenna coil, for example.

The antenna coil includes multiple linear coil conductors 21 provided on the insulator layer 11a, multiple linear coil conductors 22 provided on the insulator layer 12d, and interlayer connection conductors 23 and 24, each of which electrically connects end portions of corresponding ones of the multiple coil conductors 21 and 22 to each other, to define a helical or substantially helical shape.

The wiring conductors 31 are provided on the insulator layer 12b, and the wiring conductors 32 are provided on the insulator layer 11c. The wiring conductors 31 and 32 are disposed within a space defined by the antenna coil, in in the laminating direction of the insulator layers.

On the top surface of the multilayer body 10, which corresponds to the top surface of the insulator layer 12a, mounting electrodes 41, 42, and 43 and the like are provided. Preferably, the surface-mounted devices 51 and 52 and the like are mounted on the mounting electrodes 41, 42, and 43. On the bottom surface of the multilayer body 10, which corresponds to the bottom surface of the insulator layer 12d, terminal electrodes P3 and P8 and the like are provided.

The mounting electrodes 41, 42, and 43 and the like and the wiring conductors 31 and 32 and the like are electrically connected to one another through interlayer connection conductors 25 and 26 and the like. The terminal electrode P8 and the like are electrically connected to the wiring conductors 32 through interlayer connection conductors 27.

In FIG. 2, a plan view of the insulator layer 12d that is the lowermost layer of the multilayer body 10 shown FIG. 1 is shown in view (1)-2; a plan view of the insulator layer 12a that is the uppermost layer is shown in view (8); and plan views of the insulator layers between the layers in views (1)-2 and (8) are shown in views (2) to (7). A view from the top surface of the terminal electrode pattern on the bottom surface of the insulator layer 12d is shown in view (1)-1.

Among the multiple insulator layers included in the multilayer body 10, the insulator layers 12a, 12b, 12c, and 12d are nonmagnetic layers that include nonmagnetic ferrite, and the insulator layers 11a, 11b, 11c, and 11d are magnetic layers that include magnetic ferrite.

As shown in FIG. 2, the terminal electrodes P1 to P10 are provided on the bottom surface of the insulator layer 12d. Mounting electrodes are provided on the insulator layer 12a, and surface-mounted devices are mounted on the mounting electrodes. In the example shown in FIG. 2, a high-frequency IC RFIC (i.e., an RF communication circuit), chip capacitors C11, C12, C13, and C4, and a chip resistor R1 are surface-mounted. The various wiring conductors 31 and 32 are provided on the insulator layers 12b and 11c.

The coil conductors 21 and 22 are provided on the insulator layers 11a and 12d. The interlayer connection conductors 23 and 24 which are arranged in two lines and which electrically connect the coil conductors 21 to the coil conductors 22 are provided in the insulator layers 11a, 11b, 12b, 12c, 11c, and 11d. The interlayer connection conductors 23 and 24 may be, for example, via conductors. The coil conductors 21 and 22 and the interlayer connection conductors 23 and 24 define an antenna coil that helically or substantially helically winds with a coil opening that faces an end surface of the multilayer body 10.

FIG. 7 shows an antenna module 101P, which is a comparison example. The antenna module 101P includes a magnetic layer LC that is a layer in which an antenna coil is provided is sandwiched between nonmagnetic layers LA and LB. The antenna coil includes the multiple coil conductors 21 and 22 and the multiple interlayer connection conductors 23 and 24. The wiring conductors 31 and 32 are provided in the nonmagnetic layers LA and LB.

As in the antenna module 101P shown in FIG. 7, which is a comparison example, the magnetic layer LC in which the antenna coil is provided is sandwiched between the nonmagnetic layers LA and LB, and the wiring conductors 31 and 32 are provided in the nonmagnetic layers LA and LB. Accordingly, for example, the multilayer body may become thick due to the thickness of the nonmagnetic layers LA and LB. In addition, when the magnetic layer LC is made thin to reduce the thickness of the multilayer body, the height of a coil opening A of the antenna coil is reduced. Thus, for example, the amount of magnetic flux emitted from the antenna coil may decrease, which lowers antenna characteristics. In addition, when a high voltage is applied between the mounting electrodes 41, 42, and 43 and the like and the terminal electrodes P8 and P3 and the like via the wiring conductors 31 and 32, if the distance between the mounting and terminal electrodes and the wiring conductors is increased to provide a high voltage endurance, the size of the antenna module also increases. A thickness R shown in FIG. 7 is a dimension related to the voltage endurance. In addition, if the antenna coil is reduced in size to compensate for the additional thickness of the nonmagnetic layers LA and LB, the antenna characteristics degrade.

In contrast, the first preferred embodiment provides the following features and effects.

As shown in FIG. 1, the magnetic layers 11a and 11b are sandwiched between the nonmagnetic layer 12a and the nonmagnetic layers 12b and 12c, and the magnetic layers 11c and 11d are sandwiched between the nonmagnetic layers 12b and 12c and the nonmagnetic layer 12d. Therefore, the multilayer body 10 is able to be provided with a high mechanical strength.

A nonmagnetic ferrite layer may have a thermal shrinkage lower than that of a magnetic ferrite layer, for example. Therefore, the magnetic layers 11a and 11b, which are magnetic ferrite layers with a relatively high thermal shrinkage, are sandwiched between the nonmagnetic layer 12a and the nonmagnetic layers 12b and 12c, which are nonmagnetic ferrite layers with a relatively low thermal shrinkage. Accordingly, the entire multilayer body 10 is able to be compressed through firing, which provides a high mechanical strength of the multilayer body 10. Similarly, the magnetic layers 11c and 11d, which are magnetic ferrite layers with a relatively high thermal shrinkage, are sandwiched between the nonmagnetic layers 12b and 12c and the non-magnetic layer 12d, which are nonmagnetic ferrite layers with a relatively low thermal shrinkage. Thus, the entire multilayer body 10 is able to be compressed through firing, which provides a high mechanical strength of the multilayer body 10.

The features and effects described above are able to provide a predetermined mechanical strength even when the nonmagnetic layers 12a and 12d, which are the outermost layers, are made thin.

According to the first preferred embodiment, the wiring conductors 31 and 32 are disposed inside the winding of the antenna coil. Therefore, layers specific to arrangement of the wiring conductors 31 and 32 are not necessary. Accordingly, the multilayer body 10 may be thin. In addition, compared with a case in which an antenna is provided in a portion other than the layers on which the wiring conductors 31 and 32 are provided, the antenna coil may be made large, thus providing high or increased antenna characteristics. For example, the height of the coil opening A of the antenna coil shown in FIG. 1 is larger than the height of the coil opening A of the antenna coil shown in FIG. 7. In addition, without reducing the antenna coil in size, the antenna module may be reduced in size, for example.

The wiring conductors 31 and 32 may be disposed far from the mounting electrodes 41, 42, and 43, the terminal electrodes P3 and P8, and the like, for example, to provide a high voltage endurance. In addition, to provide a high voltage endurance, it is not necessary to increase the thickness between the layers on which the mounting electrodes 41, 42, and 43 and the terminal electrodes P3 and P8 are provided and the layers on which the wiring conductors 31 and 32 are provided, and thus the size of the antenna module is able to be reduced.

The wiring conductors 31 and 32 are disposed on a plane parallel or substantially parallel to the coil winding axis of the antenna coil. Therefore, an eddy current in the wiring conductors 31 and 32 is significantly reduced or prevented from being induced, and the wiring conductors 31 and 32 apply only a small effect to the antenna characteristics.

The multiple coil conductors 21 and 22 are in contact with the magnetic layers 11a 11b, 11c, and 11d positioned within the antenna coil. Therefore, a large amount of magnetic flux is able to be produced. In addition, no magnetic layers are present outside the antenna coil. Therefore, the magnetic flux is able to be radiated, providing increased or improved antenna characteristics. In addition, the nonmagnetic layers 12b and 12c are preferably separated from the coil conductors 21 and 22, for example, to reduce the effect of the nonmagnetic layers 12b and 12c on the antenna characteristics.

Figure 3:
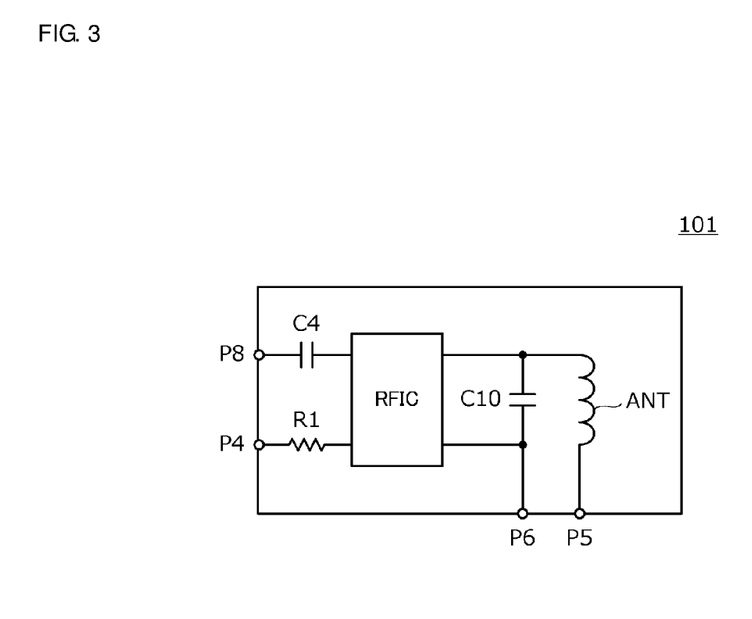
FIG. 3 is a circuit diagram of the antenna module shown in FIG. 1.

FIG. 3 is a circuit diagram of the antenna module 101 according to the first preferred embodiment. An antenna coil ANT is the antenna coil including the coil conductors 21 and 22 and the interlayer connection conductors 23 and 24. A capacitor C10 is included to finely adjust the resonant frequency, and is provided by a parallel electrical connection of the chip capacitors C11, C12, and C13 shown in FIG. 2. The antenna coil ANT and the capacitor C10 define an LC parallel resonance circuit with a resonant frequency that is able to be adjusted to a carrier frequency band (for example, the 13.56 MHz band) for communication signals.

The RFIC is an RF communication circuit. When the RFIC is set to a card emulation mode, for example, a near-field electromagnetic field received by the antenna coil is able to be converted to power, and commands received from a communication partner are able to be demodulated. In addition, predetermined information is able to be transmitted (for example, as a response) through load modulation. Thus, the antenna module is able to operate as an RFID tag.

When the RFIC is set to the reader/writer mode, transmission signals are able to be transmitted to a communication partner, and information is able to be received from the communication partner through load modulation. Thus, the antenna module is able to operate as an RF reader/writer.

In the antenna module 101 shown in FIGS. 2 and 3 in the first preferred embodiment, one end of the coil antenna is open. Therefore, for example, the antenna module 101 is able to be mounted on a printed wiring board, and the terminal electrodes P5 and P6 are able to conduct with circuitry of the printed wiring board so that the antenna module 101 operates as an antenna module. Alternatively, the coil antenna and the RFIC may define a closed loop in the antenna module so that the antenna module is able to operate by itself. In addition, the terminal electrode P8 is preferably electrically connected to an external ground and the terminal electrode P4 is preferably electrically connected to an external control circuit, for example. However, the antenna module 101 may independently operate by itself as an RFID tag, for example.

Second Preferred Embodiment

Figure 4:
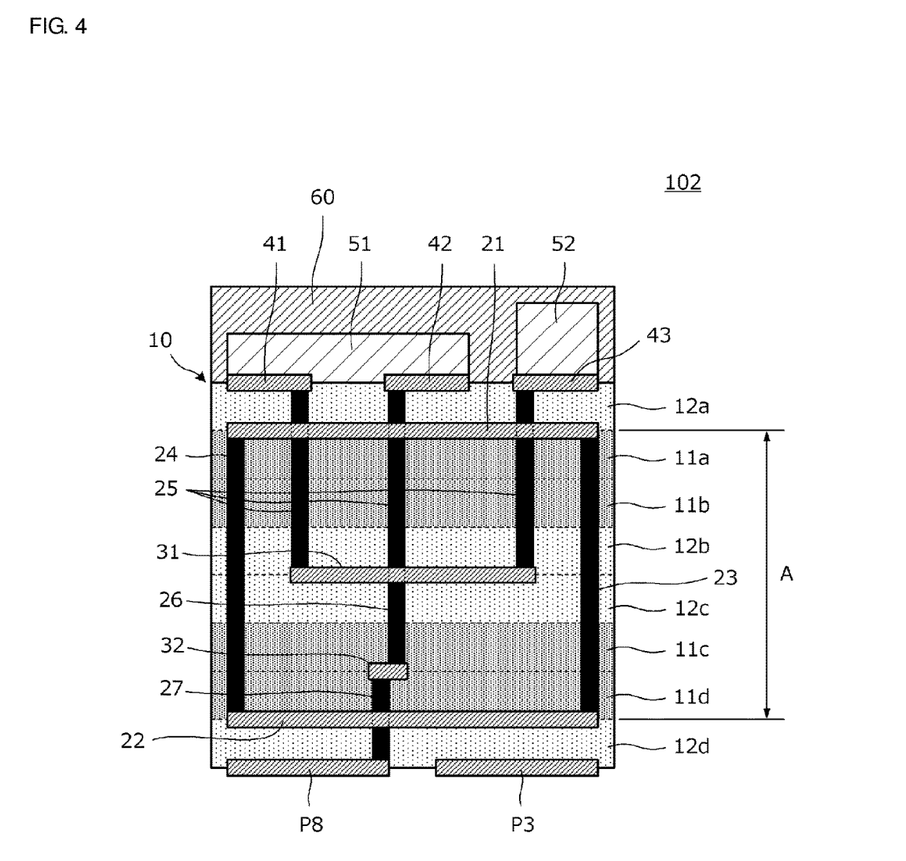
FIG. 4 is a cross-sectional view of a portion of the inside of an antenna module according to a second preferred embodiment of the present invention, in the winding axis direction of an antenna coil.

FIG. 4 is a cross-sectional view of a portion of the inside of an antenna module 102 according to a second preferred embodiment of the present invention, in the winding axis direction of the antenna coil. Compared with the antenna module 101 shown in FIG. 1 in the first preferred embodiment, the positions at which the wiring conductors 32 are provided is different in the second preferred embodiment. In addition, the second preferred embodiment includes a resin cover 60 provided on the top surface of the multilayer body 10. FIG. 4 is a view provided for simplicity of description regarding the second preferred embodiment, and the wiring arrangement, connections, and the like in the antenna module 101 shown in FIG. 2 do not completely match the wiring arrangement, connections, and the like in FIG. 4 for clarity.

As shown in FIG. 4, some of the wiring conductors 31 may be disposed within the nonmagnetic layers 12b and 12c, for example. Thus, no magnetic body or element is located adjacent to or in a vicinity of the wiring conductors 31. Therefore, the effective relative magnetic permeability is further significantly reduced or prevented compared with the effective relative magnetic permeability in the first preferred embodiment, and undesired inductance produced in the wiring conductors is able to be significantly reduced or prevented. In particular, if wiring conductors are long, undesired inductance is able to be significantly reduced or prevented. In addition, at least the nonmagnetic layers 12b and 12c are disposed between the coil conductors 21 and 22 that define a portion of the antenna coil and the wiring conductor 31. Therefore, undesired magnetic coupling between the coil conductors 21 and 22 and the wiring conductor 31 is able to be significantly reduced or prevented.

However, for example, any configuration may be included as long as at least some of the wiring conductors are provided on the surface of a nonmagnetic layer or within a nonmagnetic layer. For example, when an effect from inductance and resistance may be ignored because wiring conductors are short, or when it is not necessary to take voltage endurance in consideration because a potential difference with other conductors is low, the wiring conductors may be disposed in or on a magnetic layer.

In the second preferred embodiment, the resin cover 60 is preferably provided on the top surface of the multilayer body to cover the surface-mounted devices. The resin cover 60 includes, for example, of epoxy resin. The resin cover is thus able to protect the surface-mounted devices 51 and 52.

Third Preferred Embodiment

In a third preferred embodiment of the present invention, an antenna module including an antenna coil with a coil winding axis extending in the laminating direction of the insulator layers is described below.

Figure 5:
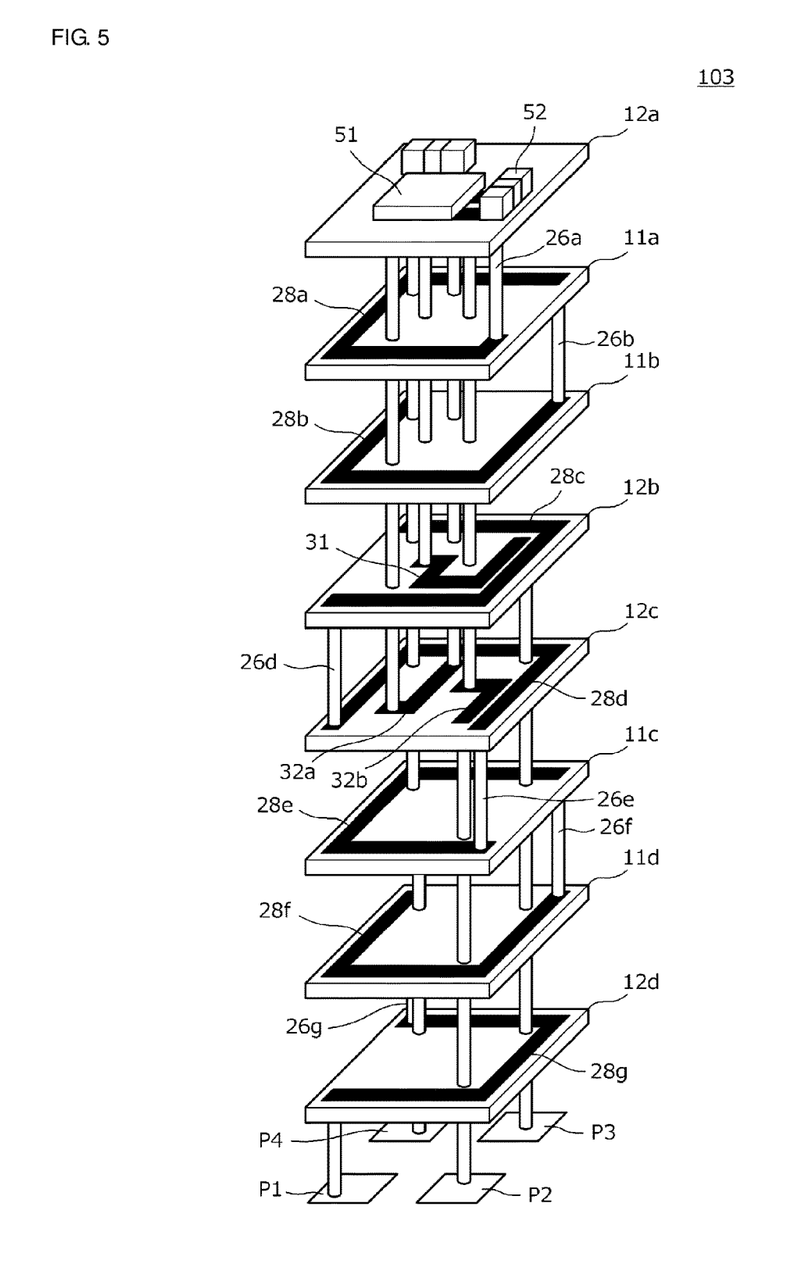
FIG. 5 is an exploded perspective view of an antenna module according to a third preferred embodiment of the present invention.

FIG. 5 is an exploded perspective view of an antenna module 103 according to the third preferred embodiment.

As shown in FIG. 5, the antenna module 103 according to the third preferred embodiment includes a multilayer body in which the insulator layers 12a, 11a, 11b, 12b, 12c, 11c, 11d, and 12d are laminated, the surface-mounted devices 51 and 52 mounted on the top surface of the multilayer body, an antenna coil with a coil winding axis extending in the laminating direction of the insulator layers, and wiring conductors 31, 32a, and 32b electrically connected with the surface-mounted devices 51 and 52 or the antenna coil.

The antenna coil includes multiple coil conductors 28a, 28b, 28c, 28d, 28e, 28f, and 28g provided on the insulator layers 11a, 11b, 12b, 12c, 11c, 11d, and 12d, and interlayer connection conductors 26a, 26b, 26d, 26e, 26f, and 26g electrically connecting the end portions of the multiple coil conductors to define a helical or substantially helical shape.

The wiring conductor 31 is provided on the insulator layer 12b, and the wiring conductors 32 are provided on the insulator layer 12c. The wiring conductors 31 and 32 are disposed within a space defined by the antenna coil in the laminating direction of the insulator layers.

On the top surface of the multilayer body 10, which corresponds to the top surface of the insulator layer 12a, mounting electrodes that mount the surface-mounted devices 51 and 52 and the like are provided. On the bottom surface of the multilayer body 10, which corresponds to the bottom surface of the insulator layer 12d, the terminal electrodes P1, P2, P3, and P4 are provided.

The mounting electrodes, the wiring conductors 31 and 32, and the like are electrically connected to each other by interlayer connection conductors.

The third preferred embodiment provides features and effects similar to those described above with respect to the first preferred embodiment. In addition, according to the third preferred embodiment, the nonmagnetic layers 12b and 12c are located in a middle portion of the magnetic path in the coil winding of the antenna coil. The nonmagnetic layers 12b and 12c provide a gap in the magnetic circuit. Therefore, the magnetic saturation of the magnetic layers 11a 11b, 11c, and 11d is significantly reduced or prevented, thus providing exceptional DC bias characteristics.

Fourth Preferred Embodiment

Figure 6:
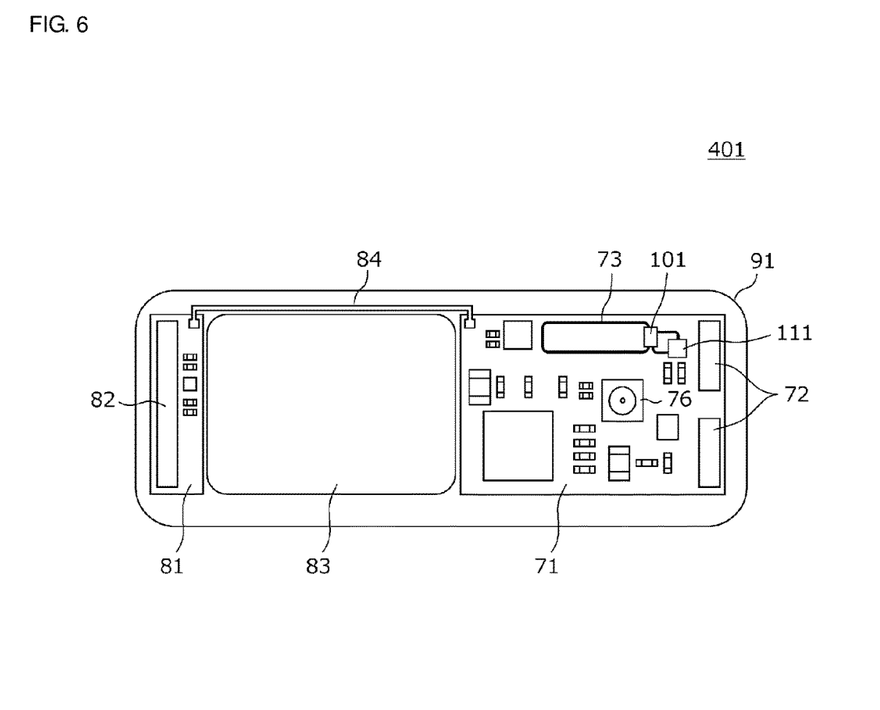
FIG. 6 is a plan view of the structure of the inside of the case of a portable terminal device according to a fourth preferred embodiment of the present invention.

FIG. 6 is a plan view of the structure of an inside of a case of a portable terminal device 401 according to a fourth preferred embodiment of the present invention. The portable terminal device 401 includes the antenna module 101 described in the first preferred embodiment.

Circuit boards 71 and 81, a battery pack 83, and the like are housed in the inside of a case 91. UHF-band antennas 72, a camera module 76, and the like are mounted on the circuit board 71. A UHF-band antenna 82 and the like are mounted on the circuit board 81. The circuit board 71 and the circuit board 81 are electrically connected to each other by a coaxial cable 84.

The antenna module 101, a control IC 111, a power supply module, and the like are mounted on the circuit board 71. The control IC 111 is an example of a "control circuit" according to a preferred embodiment of the present invention. A wiring conductor pattern 73 is provided on the circuit board 71. The terminal electrodes P5 and P6 shown in FIG. 3 are electrically connected to the respective ends of the wiring conductor pattern 73. Therefore, the wiring conductor pattern 73 and the antenna coil in the antenna module 101 operate as a portion of a radiating element.

The portable terminal device 401 according to the fourth preferred embodiment is able to receive/transmit data stored in the portable terminal device or an external device from/to the external device. In addition, the wiring conductor pattern on the circuit board is included as a portion of a radiating element to increase an area in which magnetic flux is radiated/concentrated, thus increasing the antenna characteristics.

In addition to a portable terminal device, preferred embodiments of the present invention may be applied to an electronic device, for example, a smartphone, a tablet terminal, a notebook personal computer, a wearable terminal, smartglasses, a smartwatch, a game machine, a camera, an RFID tag, a card, and the like.

RFID communication in the 13.56 MHz band has been described as an example. In addition to a HF band, preferred embodiments of the present invention may be similarly applied to a UHF-band system used in a wireless LAN and the like, for example. In preferred embodiments of the present invention, antenna modules and the electronic device which are used in a communication system that operates by magnetic coupling have been described. However, the antenna modules and the electronic device in the preferred embodiments may be adapted for a power-transmission antenna module or a power-reception antenna module in a contactless power transmission system (for example, an electromagnetic induction system or a magnetic resonance system) based on magnetic coupling or the like. An active component or element (for example, a switching device or a diode) or a passive component or element (for example, a capacitor or an inductor), which is included in a power transmission circuit or a power-reception circuit, may be included as a surface-mounted device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna module comprising:
a multilayer body including a plurality of insulator layers laminated on one another in a laminating direction;
a surface-mounted device mounted on a top surface of the multilayer body;
an antenna coil including a plurality of coil conductors and a plurality of interlayer connection conductors that define a helical or substantially helical shape; and
at least one wiring conductor that is provided on at least one of the plurality of insulator layers and that is electrically connected with the surface-mounted device or the antenna coil; wherein a coil winding axis of the antenna coil extends in a direction in which surfaces of the plurality of insulator layers extend;
the plurality of coil conductors of the antenna coil are provided on more than one of the plurality of insulator layers;
each of the plurality of interlayer connection conductors electrically connects end portions of corresponding ones of the plurality of coil conductors to each other; and
the at least one wiring conductor is located in a space defined by a structure of the antenna coil;
the at least one wiring conductor is disposed in the laminating direction of the insulator layers.

2. The antenna module according to claim 1, wherein more than one of the plurality of insulator layers includes a plurality of magnetic layers and at least one nonmagnetic layer located between the plurality of magnetic layers; and
each of the more than one of the plurality of insulator layers is included in the multilayer body and is a layer in which the antenna coil is provided.

3. The antenna module according to claim 2, wherein the at least one wiring conductor is disposed on a surface of the nonmagnetic layer or in the nonmagnetic layer.

4. The antenna module according to claim 2, wherein a thermal shrinkage of the at least one nonmagnetic layer is lower than a thermal shrinkage of the plurality of magnetic layers.

5. An electronic device comprising:
the antenna module according to claim 1.

6. The electronic device according to claim 5, further comprising:
a circuit board that includes a wiring conductor pattern provided thereon; wherein
the wiring conductor pattern is electrically connected to the antenna coil of the antenna module.

7. The antenna module according to claim 1, wherein a bottom surface of the multilayer body includes at least one terminal electrode.

8. The antenna module according to claim 7, wherein the at least one terminal electrode is electrically connected to the at least one wiring conductor through at least one of the plurality of interlayer connection conductors.

9. The antenna module according to claim 7, wherein the at least one terminal electrode is electrically connected to an external ground.

10. The antenna module according to claim 7, wherein the at least one terminal electrode is electrically connected to a control circuit.

11. The antenna module according to claim 1, wherein the top surface of the multilayer body includes at least one mounting electrode to mount the surface-mounted device.

12. The antenna module according to claim 1, wherein the surface-mounted device is a radio-frequency communication circuit.

13. The antenna module according to claim 12, wherein the radio-frequency communication circuit controls the antenna module to operate as a radio frequency identification tag.

14. The antenna module according to claim 1, wherein the surface-mounted device is a chip capacitor or a chip resistor.

15. The antenna module according to claim 1, wherein no magnetic body is located adjacent to or in a vicinity of the at least one wiring conductor.

16. The antenna module according to claim 1, wherein a resin cover is provided on the top surface of the multilayer body and covers the surface-mounted device.

\* \* \* \* \*